C. WAGNER.
HOSE REEL.
APPLICATION FILED OCT. 21, 1911.
1,043,647.
Patented Nov. 5, 1912.
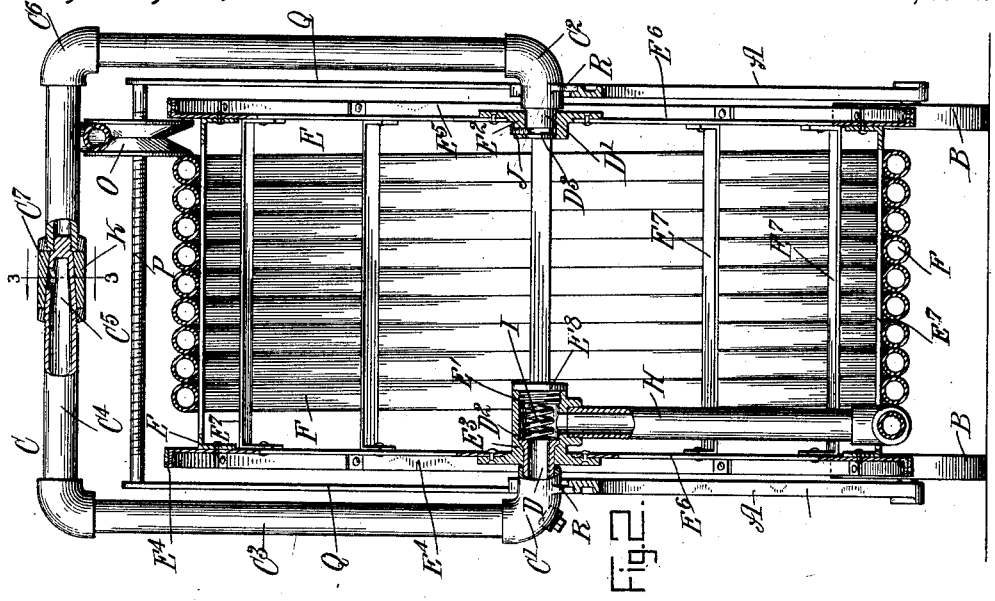
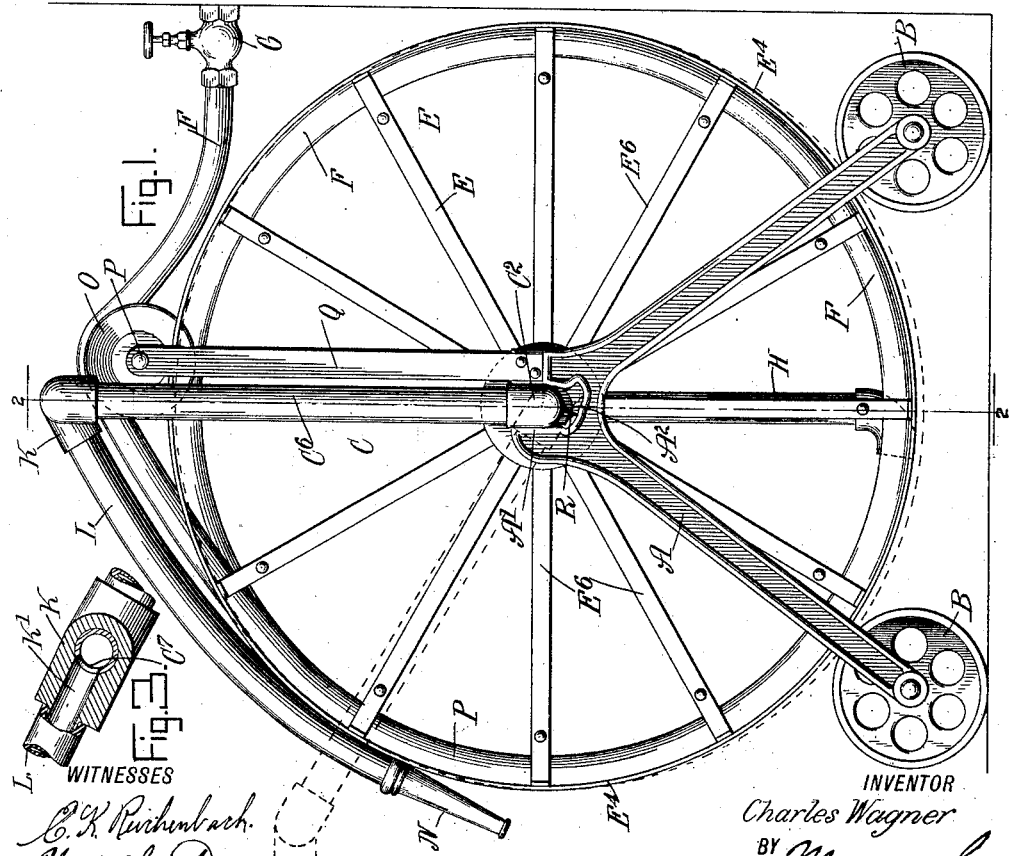
WITNESSES
INVENTOR
Charles Wagner
BY
ATTORNEYS

UNITED STATES PATENT OFFICE.

CHARLES WAGNER, OF GRANTWOOD, NEW JERSEY.

HOSE-REEL.

1,043,647. Specification of Letters Patent. Patented Nov. 5, 1912.

Application filed October 21, 1911. Serial No. 655,903.

*To all whom it may concern:*

Be it known that I, CHARLES WAGNER, a citizen of the United States, and a resident of Grantwood, in the county of Bergen and State of New Jersey, have invented a new and Improved Hose-Reel, of which the following is a full, clear, and exact description.

The object of the invention is to provide a new and improved hose reel for use in gardens and other places, and arranged to permit of conveniently moving the hose reel about and on unreeling and stretching a desired length of hose from the water supply to the place to be sprinkled, at the same time permitting the water to pass through the unreeled portion of the hose as well as through the hose still wound up on the drum of the hose reel, and to allow of unreeling or reeling up the hose without moving the hose reel about.

For the purpose mentioned, use is made of a wheeled frame or a carriage adapted to run on the ground, a hose-carrying drum mounted to turn on the said frame and normally in contact with the wheels of the frame to rotate the drum on running the frame about for reeling up or unreeling the hose according to the direction in which the frame or carriage is run at the time, and means for bodily raising the drum on the frame to disengage the drum from the wheels with a view to allow turning of the drum at the time the frame is at a standstill.

A practical embodiment of the invention is represented in the accompanying drawings forming a part of this specification, in which similar characters of reference indicate corresponding parts in all the views.

Figure 1 is a side elevation of the hose reel showing the hose-carrying drum in a raised position; Fig. 2 is a cross section of the same on the line 2—2 of Fig. 1; and Fig. 3 is an enlarged sectional side elevation of the outlet valve, the section being on the line 3—3 of Fig. 2 and the valve being in open position.

On the main frame or carriage A of the hose reel are journaled pairs of wheels B to permit of conveniently running the frame about on the ground, and on the said frame are arranged bearings A′ engaged by the inwardly-turned ends C′ and C² of a U-shaped drum frame C, which also forms a handle for moving the frame or carriage A about. The inwardly-turned ends C′, C² of the drum frame C are provided with trunnions D, D′, on which are mounted to turn the hubs or bearings E′ and E² of a drum E, on which winds a hose F connected at one end with a valved water supply G and at its other end with a pipe H extending radially from the hub or bearing E′. The hub or bearing E′ is made hollow and likewise the trunnion D which latter opens into the hollow hub or bearing E′, and the inner end of the trunnion D is provided with a flange D² engaging a seat E³ formed on the hub or bearing E′ so as to insure a water-tight joint between the trunnion D and the hollow hub or bearing E′. A spring I is contained in the hub or bearing E′ and presses with one end against the trunnion D and at the other end against a cap E⁸ employed for closing the inner end of the hub or bearing E′, as will be readily understood by reference to Fig. 2. The trunnion D′ is preferably provided with an annular groove D³ engaged by a set screw J held on the hub E² to hold the said hub against axial movement on the trunnion D′. The drum E is provided at the sides with flat rims E⁴, E⁵ normally resting on the peripheral faces of the wheels B, so that when the hose reel is moved about over the ground and the wheels B are turned, then a turning movement is given to the drum E in either a forward or a backward direction according to the direction in which the frame or carriage A is moved at the time so that the hose F is either unreeled or reeled up on the drum E.

In order to render the hose drum E as light as possible use is made of spokes E⁶ extending from the hubs E′ and E² outwardly in a radial direction to connect with the rims E⁴, E⁵, and oppositely-disposed spokes E⁶ are connected with each other by cross bars E⁷ forming the main rim of the hose reel for supporting the hose F.

The inwardly-turned end C′ of the drum frame or handle C is made hollow and connected by a hollow side arm C³ with a hollow handle C⁴ terminating in a tapering plug C⁵ screwed to the member C⁶ connected with the other inwardly-turned end C², as plainly indicated in Fig. 2. The plug C⁵ is surrounded by a valve K having an opening K′ adapted to register with a port C⁷ formed in the wall of the plug C⁵, and on the valve K is mounted a short piece of hose L provided at its free end with a nozzle N, of any approved construction. Now when the drum frame or handle C is in a vertical position and the hose L hangs downward and rests on the peripheral face of the hose F wound on the drum E then the opening K' of the valve K is out of register with the port C⁷, but when the frame or handle C is swung downward into the position shown in dotted lines in Fig. 1 and the operator holds the piece of hose L in an approximately horizontal position, then the opening K' is in register with the port C⁷ and consequently water can now pass from the water supply G through the hose F, pipe H, bearing H', trunnion D, end C', member C³, plug C⁵ and valve K into the hose L and out of the same through the nozzle N to the place to be sprinkled. When the operator drops the hose while the frame or handle C is in the inclined position shown in dotted lines in Fig. 1, then the valve K is swung automatically into closed position to cut off the water at the valve K and the plug C⁵ from the hose L and nozzle N.

In order to insure a proper reeling and unreeling of the hose F on the hose drum E, use is made of a guide pulley O mounted to screw on a screw rod P attached to arms Q secured to the frame A. The pulley O is preferably provided with a V-shaped groove into which is placed at the top the hose F and the peripheral face of the pulley O is close to the cross bars E⁷ of the drum E. When the hose F is entirely wound up on the drum E the pulley O is adjacent the rim E⁵ of the drum E, and when the hose reel is now run forward and the drum E is rotated by contact of its rims E⁴, E⁵ with the wheels B then the pulley O is turned by the unreeling hose F, and in doing so it screws on the screw rod P thereby traveling toward the other rim E⁴ of the drum E. The thread on the screw rod P is arranged relative to the external diameter of the hose F so that on each complete revolution of the drum E the pulley O advances in a transverse direction a distance corresponding to the outside diameter of the hose F. When the hose reel is run backward or toward the supply G then the drum E is rotated in a reverse direction to reel up the hose unreeled from the supply G to the drum, and during this reeling up of the hose F the guide pulley O is caused to travel in a reverse direction, that is, toward the rim E⁵ to properly lay the hose onto the rim of the drum E, that is, with the convolutions of the hose one close to the other.

It will be noticed that when the hose reel is in use a permanent connection is made between the supply G and the pipe H, which in turn is connected by the means described with the valve K, the short hose L and the nozzle N, and consequently any desired length of hose can be unreeled by running the carriage forward the desired distance, and then sprinkling can be begun in any desired direction owing to the short piece of flexible hose L connected with the valve K and carrying the nozzle N.

When it is desired to reel up or unreel the hose F without running the frame or carriage A about, it is necessary to lift the drum E bodily relative to the wheels B so as to disengage the rims E⁴ and E⁵ from the peripheral faces of the wheels B. For the purpose mentioned use is made of cams R formed or secured on the ends C' and C² of the frame or handle C, the said cams engaging the cam bottoms A² of the bearings A', so that when the handle C is swung into a vertical position, as shown in Figs. 1 and 2, then the cams R on traveling up on the inclined faces of the bottoms A² lift the handle and with it the trunnions D, D' and the drum E journaled on the said trunnions. When the handle C is swung downward into the inclined position shown in dotted lines in Fig. 1 then the cams R travel down on the inclined bottoms A² of the bearings A', whereby the handle C and the parts supported thereon are lowered until the rims E⁴ and E⁵ rest on the peripheral faces of the wheels B.

It is understood that when the drum E is in the raised position, that is, is free of the wheels B, it can be readily turned on its trunnions D and D' while the frame or carriage is at a standstill, and consequently the hose F is reeled or unreeled on rotating the drum in either a forward or a backward direction.

Having thus described my invention, I claim as new and desire to secure by Letters Patent:

1. A hose reel, comprising a carriage provided with wheels adapted to travel on the ground, a hose drum adapted to be moved in and out of contact with the said wheels and provided with a pipe, a hose adapted to wind and unwind on the said drum and having one end connected with the said pipe, the other end of the said hose being adapted to connect with a source of water supply, a hollow handle mounted to swing on the said carriage and on which the said drum is mounted to turn, the said handle being connected with the other end of the said pipe, and the said handle on swinging it in one direction lifting the drum out of engagement with the carriage wheels and on swinging it in the opposite direction moving the drum into contact with the said carriage wheels, and a nozzle connected with the said handle.

2. A hose reel, comprising a carriage provided with wheels adapted to travel on the ground, a hose drum adapted to be moved in and out of contact with the said wheels and provided with a pipe, a hose adapted to wind and unwind on the said drum and having one end connected with the said pipe, the other end of the said hose being adapted to connect with a source of water supply, a hollow handle mounted to swing on the said carriage and on which the said drum is mounted to turn, the said handle being connected with the other end of the said pipe, and the said handle on swinging it in one direction lifting the drum out of engagement with the carriage wheels and on swinging it in the opposite direction moving the drum into contact with the said carriage wheels, an outlet valve on the said hollow handle, and a nozzle connected with the said valve to open and close the latter on swinging the nozzle up or down.

3. A hose reel, comprising a carriage having wheels adapted to travel on the ground, a hose drum provided with a pipe, a hose adapted to wind and unwind on the said drum and having one end connected with the outer end of the said pipe, the other end of the hose being adapted to connect with a source of water supply, a hollow handle on the said carriage and provided with trunnions on which the said drum is mounted to turn, one of the said trunnions being hollow and connected with the said pipe, a valve on the said hollow handle, and a nozzle connected with the said valve.

4. A hose reel, comprising a carriage having wheels adapted to travel on the ground, a hose drum provided with bearings of which one is hollow, a pipe extending from the said hollow bearing, a hose adapted to wind and unwind on the said drum and having one end connected with the outer end of the said pipe, the other end of the hose being adapted to connect with a source of water supply, a hollow handle on the said carriage for moving the latter about, the handle having trunnions on which the said drum is mounted to turn, one of the said trunnions being hollow and opening into the said hollow bearing and the said handle being connected with the said hollow trunnion, a valve on the said hollow handle, and a nozzle connected with the said valve.

5. A hose reel, comprising a carriage having wheels adapted to travel on the ground, a hose drum adapted to move in or out of peripheral engagement with the said wheels, a hollow handle for moving the said carriage about and provided with trunnions on which the said drum is mounted to turn, a pipe on the said hose drum and connected with the said hollow handle by way of one of the said trunnions, a hose winding and unwinding on the said hose drum and having one end connected with the said pipe, the other end of the said hose being adapted to connect with a source of water supply, an outlet valve on the said handle, and a nozzle connected with the said outlet valve for opening or closing the same on swinging the nozzle up or down.

6. A hose reel, comprising a carriage having wheels adapted to travel on the ground, a hose drum adapted to move in or out of peripheral engagement with the said wheels, a hollow handle for moving the said carriage about and provided with trunnions on which the said drum is mounted to turn, a pipe on the said hose drum and connected with the said hollow handle by way of one of the said trunnions, a hose winding and unwinding on the said hose drum and having one end connected with the said pipe, the other end of the said hose being adapted to connect with a source of water supply, an outlet valve on the said handle, a nozzle connected with the said outlet valve for opening or closing the same on swinging the nozzle up or down, and means on the said handle and carriage for bodily raising or lowering the said hose drum to move the latter in or out of engagement with the said carriage wheels.

7. A hose reel, comprising a carriage having wheels adapted to travel on the ground, a hose drum provided with bearings of which one is hollow, a pipe extending from the said hollow bearing, a hose adapted to wind and unwind on the said drum and having one end connected with the outer end of the said pipe, the other end of the hose being adapted to connect with a source of water supply, a hollow handle on the said carriage for moving the latter about, the handle having trunnions on which the said drum is mounted to turn, one of the said trunnions being hollow and opening into the said hollow bearing and the said handle being connected with the said hollow trunnion, a valve on the said hollow handle, a nozzle connected with the said valve, the said hollow bearing and the said hollow trunnion having contacting joint members, and a spring interposed between the said hollow bearing and the said hollow trunnion to hold the said joint members in contact one with the other.

In testimony whereof I have signed my name to this specification in the presence of two subscribing witnesses.

CHARLES WAGNER.

Witnesses:
 THEO. G. HOSTER,
 PHILIP D. ROLLHAUS.

Copies of this patent may be obtained for five cents each, by addressing the "Commissioner of Patents, Washington, D. C."